No. 716,622. Patented Dec. 23, 1902.
F. BROSTROM.
HANDLE FOR FARE REGISTER RODS, &c.
(Application filed June 14, 1902.)
(No Model.)

WITNESSES:
Henry Krug
Russell M. Everett

INVENTOR:
Frederick Brostrom,
BY
Drake & Co.
ATTORNEYS.

UNITED STATES PATENT OFFICE.

FREDERICK BROSTROM, OF JERSEY CITY, NEW JERSEY.

HANDLE FOR FARE-REGISTER RODS, &c.

SPECIFICATION forming part of Letters Patent No. 716,622, dated December 23, 1902.

Application filed June 14, 1902. Serial No. 111,607. (No model.)

*To all whom it may concern:*

Be it known that I, FREDERICK BROSTROM, a citizen of the United States, residing at Jersey City, in the county of Hudson and State of New Jersey, have invented certain new and useful Improvements in Handles for Fare-Register Rods, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to permit of the removal of a handle from the bar or rod commonly found in trolley and tramway cars by means of which the fare-register therein is operated without disconnecting the said rod from the fare-register or otherwise interfering with the operations of the said register rod or bar or other handles thereon. Heretofore it has been a frequent practice to provide the said rod or bar with a handle having an eye or hole at one end through which the rod passes, the rod and handle being held in rigid relation one to the other by means of a set-screw, and thus when the set-screw became worn or incapable of holding the said handle rigid on the rod it became necessary in providing a new handle to remove the rod from its bearings and connection with the fare-register and slip the handle longitudinally from said rod, removing all intervening or obstructing handles, all of which involved a material loss of time and was productive of trouble. By the present construction the handle may be removed without disturbing the other handles on said rod or disconnecting the rod from the fare-register or from its bearings, all of which conduces to greater convenience and a saving of labor.

The invention consists in the improved handle and in the arrangements and combinations of parts of the same, all substantially as will be hereinafter set forth and finally embraced in the clauses of the claim.

Figure 1:
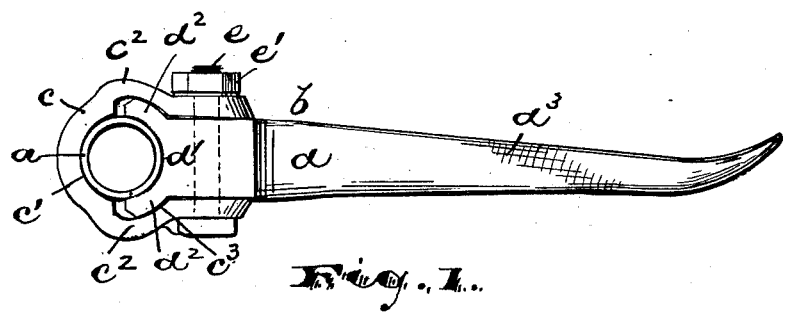
Figure 2:
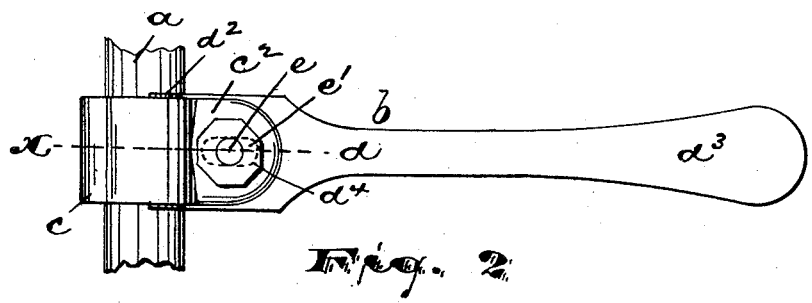
Figure 3:
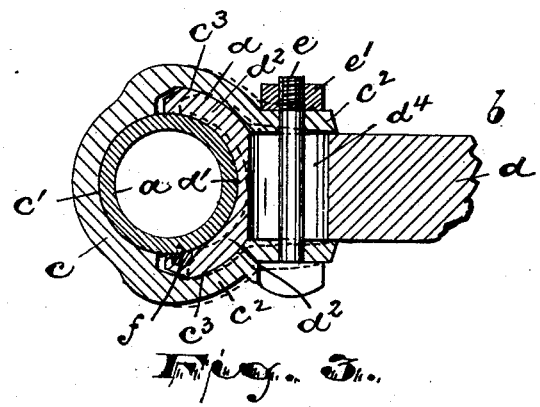

Referring to the accompanying drawings, in which like letters of reference indicate corresponding parts in each of the several figures, Figure 1 is a side elevation of my improved handle in connection with a rod or bar. Fig. 2 is a plan of the same; and Fig. 3 is a section, on an enlarged scale, taken at line $x$ of Fig. 2.

In said drawings, $a$ indicates the rod or bar, usually arranged lengthwise of a car adjacent to and parallel with the grab-strap rod (not shown) and connecting with the fare-register in any ordinary manner. $b$ indicates the handle arranged on said rod. Said handle comprises two clamping-sections $c$ and $d$ and a bolt and nut $e$ $e'$ for holding the said parts together. The section $c$ is preferably a casting having a bearing $c'$ to conform to and receive or engage the rod $a$, at one side thereof, and at opposite sides of said bearing $c'$ having ears $c^2$ $c^2$, which extend forward across the plane of the axis of said rod $a$. Said ears are perforated to receive the bolt $e$ and are adapted to receive the section $d$ of the handle therebetween. At points between the said plane of the axis of the rod crossed by the ears $c^2$ and the perforations in said ears the latter are provided with bearings $c^3$ $c^3$, inclined to the said plane of the axis of the rod, the said inclined bearing being formed by notching out or recessing the inside surfaces of the said ears, as shown in Figs. 1 and 3. The section $d$ of the handle is also provided with a recess or bearing $d'$ to conform to and engage the rod at a point opposite that engaged by the bearing $c'$, the said bearings when the rod is round being made to conform more or less closely to the curvature of the rod. At the opposite sides of the said bearing $d'$ the said section $d$ is provided with ears $d^2$ $d^2$, adapted to enter the opposite recesses at the inner sides of the ears $c^2$ $c^2$, the said ears $d^2$ being also provided with inclines to coincide with and engage the inclined surfaces of the said ears $c^2$. The ears $c^2$ are normally open, so that a space is formed between the ears larger in area, in plan, than the area of the end of the section $d^2$ contiguous to the rod $d'$. The said ears are somewhat resilient and are adapted to be drawn together by the bolt $e$ when the latter is screwed up and the inclines of the sections $c$ are brought into engagement with the inclines of the section $d$, the said inclines being so disposed as to force the clamping surfaces or bearing $c'$ $d'$ hard against the rod $a$, thus clamping said rod with great firmness, rigidity, and security.

I may to insure against a slipping of the sections $c$ $d$ on the rod provide one of said sections, preferably the section $d$, with one or more inserted steel teeth $f$, which are embedded in the section $d$, preferably in the casting operation, the said section $d$ being ordinarily made of brass for purposes of ornamentation or otherwise and not possessing the required hardness to bite into the rod when the parts are clamped together.

Should I desire to remove the handle $b$ from the rod $a$ for any purpose, it is only necessary to unscrew the nut $e'$ of the bolt $e$, slip the said bolt out from the bolt-holes in the sections $c$ $d$, thus permitting the resilient arms $c^2$ $c^2$ to spread and permit of the lateral slipping operation of one of said sections from the other, and when the parts are thus detachable both said sections may be easily removed from the rod, as will be obvious.

The handled extension $d^3$ is flattened at its projecting end, and thus is adapted to receive pressure of the conductor's hand in turning the rod and operating the fare-register in any ordinary manner.

The bolt-hole $d^4$ in the section $d^3$ is preferably a slot and permits of a slipping of the ears $c^2$ $c^2$ on the section $d$ in the clamping operation, as will be obvious.

While I prefer the handle to be employed in connection with fare-register rods, it is obvious that the same handle may be employed for other purposes.

Having thus described the invention, what I claim as new is—

1. The combination with a rod $a$, of a handle comprising sections $c$, $d$, provided with bearings to engage the opposite sides of the rod and one of said sections being provided with ears between which the other section is arranged and each of said sections being provided with a bolt-hole and coinciding inclined bearings, and a bolt arranged through said bolt-holes and adapted to cause the said inclined bearings to press one against the other and effect a clamping of said rod, substantially as set forth.

2. The improved fare-register handle comprising sections $c$, $d$, one of which is provided with ears having recesses on the inner sides thereof, and the other of which is provided with ears $d^2$, to enter the said recesses, and a bolt adapted to clamp the said ears of one section against the ears of the other section and effect a clamping movement of one section on the other, whereby the sections are brought into fixed relation to the fare-register rod, substantially as set forth.

3. The improved handle comprising a section having a rod-bearing and perforated ears at opposite sides of said rod-bearing, a perforated section adapted to enter between said perforated ears both said sections having inclined surfaces, and a bolt and nut to effect an engagement of the coöperating inclines and a clamping movement of one section on the other, substantially as set forth.

4. The improved handle comprising a section having a rod-bearing and perforated inclined ears at opposite sides of said rod-bearing, said ears being recessed on their inner sides to receive inclined ears of the coöperating section, and said coöperating section arranged between the ears of the first said section and having inclines on opposite sides of an intermediate rod-bearing, adapted to enter the recesses on the inside of the ears of said first section, the last section being slotted, and a bolt adapted to enter the perforations and slot and clamp the parts together, substantially as set forth.

In testimony that I claim the foregoing I have hereunto set my hand this 27th day of May, 1902.

FREDERICK BROSTROM.

Witnesses:
CHARLES H. PELL,
FRANK F. BODLER.